No. 661,799. Patented Nov. 13, 1900.
T. L. GOOD.
POTATO PLANTER.
(Application filed Aug. 13, 1900.)
(No Model.) 2 Sheets—Sheet 1.
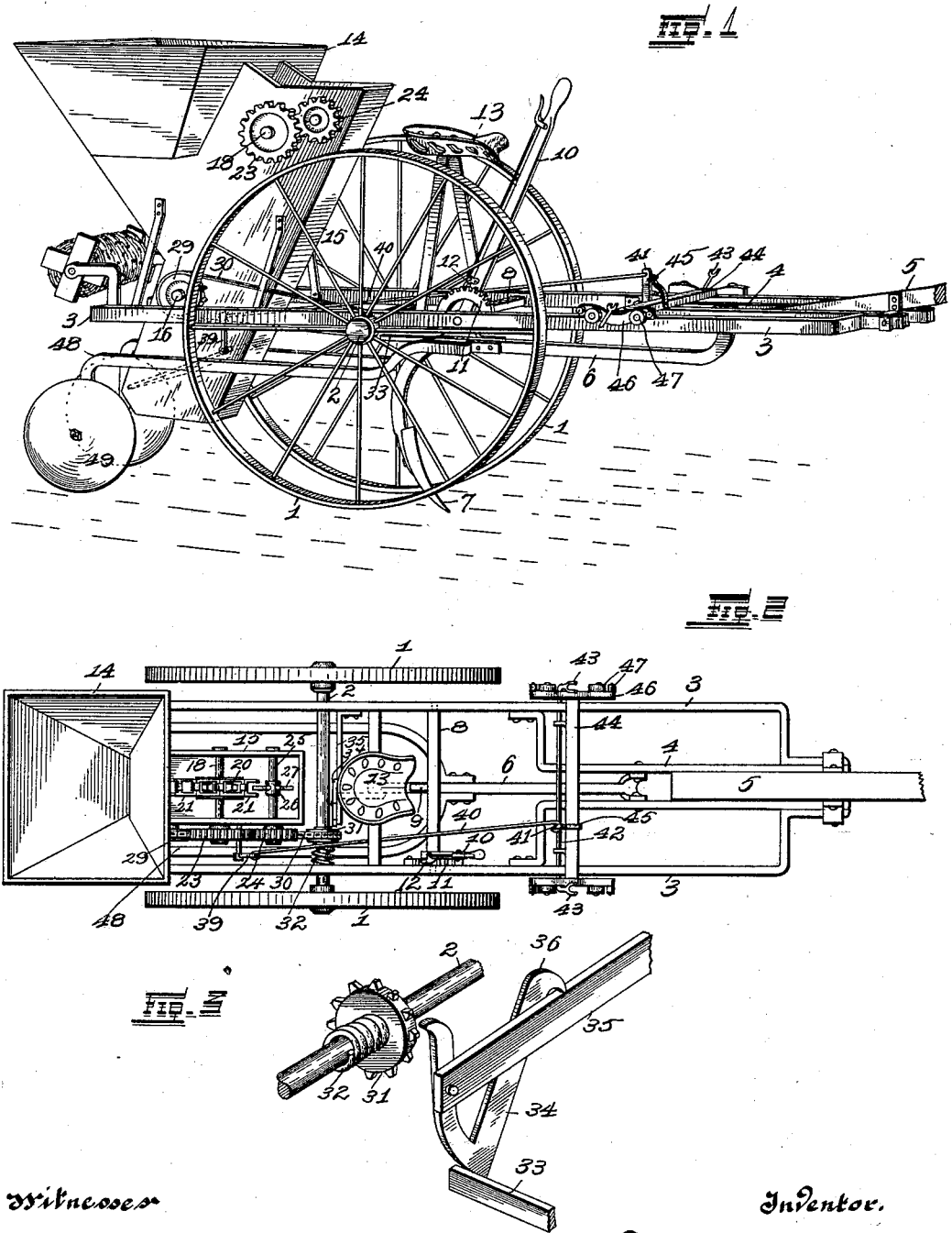

No. 661,799. Patented Nov. 13, 1900.
T. L. GOOD.
POTATO PLANTER.
(Application filed Aug. 13, 1900.)
(No Model.) 2 Sheets—Sheet 2.
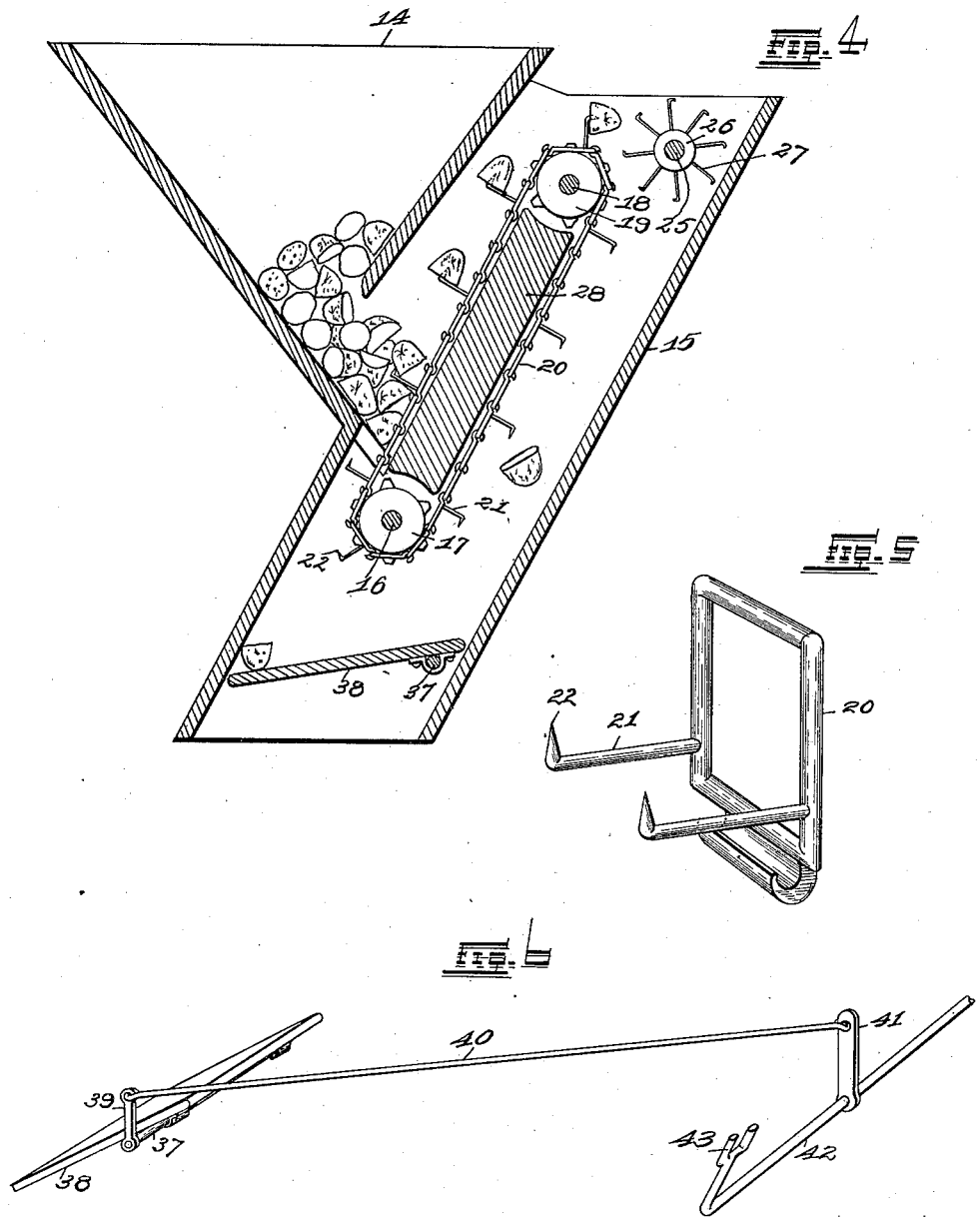
Witnesses
Alfred W Eicker
J.D. Rippey
Inventor
Thomas L. Good.
By Higdon & Longan, Atty's

UNITED STATES PATENT OFFICE.

THOMAS L. GOOD, OF EDWARDSVILLE, ILLINOIS.

POTATO-PLANTER.

SPECIFICATION forming part of Letters Patent No. 661,799, dated November 13, 1900.

Application filed August 13, 1900. Serial No. 26,752. (No model.)

*To all whom it may concern:*

Be it known that I, THOMAS L. GOOD, of the city of Edwardsville, Madison county, State of Illinois, have invented certain new and useful Improvements in Potato-Planters, of which the following is a full, clear, and exact description, reference being had to the accompanying drawings, forming a part hereof.

This invention relates to potato-planters;
and it consists of the novel construction, combination, and arrangement of parts hereinafter shown, described, and claimed.

Figure 1 is a view in perspective, showing my improved potato-planter. Fig. 2 is a plan view of the same. Fig. 3 is a perspective view showing the parts made use of to throw the planting mechanism into an inoperative position. Fig. 4 is a sectional view showing the carrier made use of in carrying out the invention. Fig. 5 is a perspective view showing one of the carriers. Fig. 6 is a perspective view showing a part of the mechanism made use of to drop the potatoes at the required time.
Referring to the drawings in detail, 1 indicates the traction-wheels supporting an axle 2, upon which is mounted the outer frame 3. Supported within the forward end of the frame 3 is a pair of angled bars 4, the rear ends of which are connected to the sides of the frame 3 and their forward ends are connected to the forward end of the frame 3, and between the bars 4 is secured the rear end of the tongue 5. A plow-beam 6 has its forward end pivoted between the bars 4 and carries on its downwardly-bent rear end a plow 7, which, as is readily understood, may be of any preferred shape and construction. Supported by the frame 3 above the rear end of the plow-beam 6 is a transverse bar 8, which is mounted in suitable bearings in the said frame 3. An arm 9, carried by the bar 8, has its lower end pivoted to the plow-beam 6, and as the said bar 8 is turned in its bearings the plow-beam and the plow carried thereby will be raised. Connected to one end of the transverse bar 8 is a lever 10, and as the said lever is operated the bar 8 will be oscillated, thereby raising or lowering the plow, as described.
A ratchet-segment 11 is supported adjacent to the lever 10, and a pawl 12, carried by the said lever, operates upon the ratchet-segment, thereby holding the parts in any adjustment in which they are placed.

13 indicates a seat supported by the frame 3 in a suitable position relative to the other parts of the machine. Carried above the rear end of the frame 3 is a hopper 14, within which the potatoes are placed before being dropped into the furrow made by the plow 7.

As shown in Fig. 4, the lower end of the hopper 14 is open and communicates with a substantially vertical guideway 15. Supported in the sides of the guideway 15 below the point of communication with the hopper 14 is a horizontal shaft 16, rigid with which is a sprocket-wheel 17. A corresponding shaft 18 is supported within the upper extremity of the guideway 15 and carries a sprocket-wheel 19. A carrier-chain 20 operates around the said sprocket-wheels, and carried by the carrier-chain 20 at suitable intervals are projections 21, integral with the ends of which are the pointed projections 22, the purpose of which is to engage the potatoes and carry them out of the receptacle to be delivered into the furrow. On the outer end of the shaft 18 is a large gear-wheel 23, which meshes with a small gear 24, carried on the outer end of the shaft 25, supported by the upper end of the guideway 15. Within the guideway on the shaft 25 is a sleeve 26, carried by which is a series of arms 27, the purpose of which is to remove the potatoes from the carriers after they have been carried above the shaft 18. As the shaft 18 is rotated and the potatoes are carried upwardly the shaft 25 will be rotated in an opposite direction, and the arms 27, moving more rapidly than the carrier, will contact with the potatoes and remove them therefrom, causing them to drop downwardly within the guideway 15. A transverse frame 28 is supported by the sides of the guideway 15, and the carrier-chain 20 operates around the same.
Rigid with the outer end of the shaft 16 is a sprocket-wheel 29, around which passes the chain 30, which is also passed around the wheel 31, loosely carried on the axle 2. The sprocket 31 is pressed inwardly against an enlargement on the axle 2 by means of a spring 32, and when in such position it will be rotated with the axle, thereby operating the carrier within the guideway 15. This operation takes place as the result of the movement of the machine over the surface; but on some occasions it is desirable to move the machine without operating the carrier. I provide a means for so doing, comprising the elements which will now be described. Projecting rearwardly from the plow-beam 6 is an arm 33, the rear end of which rests against an angled lever 34. The said angled lever 34 is pivotally carried by an arm 35, secured to the outer frame 3. The upper end of the lever 34 is adjacent to the sprocket 31 and when pressed outwardly removes the said sprocket-wheel from the enlargement on the axle 2, and thereby leaves the sprocket-wheel free to turn on the axle. Whenever the lever 10 is operated to raise the plow-beam, the arm 33 is raised against the lower end of the lever 34, which presses outwardly the upper end, thereby removing the sprocket 31 out of contact with the enlargement against which it normally rests. The lever 34 is retained in its normal position by a projection 36, which rests upon the upper side of the arm 35.

After the potatoes are removed from the carrier it is necessary that they be dropped at uniform distances from each other. The mechanism which I employ to accomplish this result will now be described.

Supported by the sides of the guideway 15 below the carrier is a horizontal shaft 37, rigidly secured to which within the guideway 15 is a door or plate 38, which is of a size sufficient to close the guideway and prevent the potatoes from passing therefrom. This door is supported at a suitable incline, so that the potatoes will gravitate to one side thereof. The shaft 37 projects from the side of the guideway 15 and carries on its projecting end an arm 39, pivoted to the upper end of which is a rod 40. The forward end of the rod 40 is connected to a vertical arm 41, rigid with the rod 42, supported in bearings in the frame 3. The outer ends of the rod 42 are turned upwardly and are bifurcated, as indicated by 43. A transverse bar 44 is supported by the frame 3 adjacent to the rod 42, and the arm 41 is normally held in its vertical position by means of a spring 45, secured to the bar 44, and loosely connected to said arm 41 on the outer ends of the bar 44 are arms 46, and carried thereby are the rollers 47. From this description it is evident that the potatoes will be retained within the guideway 15 upon the door 38 and will only be dropped therefrom into the furrow by removing the said door 38. This is done by an ordinary link or knotted wire, shown supported on a spool at the rear of the machine in Fig. 1. The wire is drawn across the field and is placed within the bifurcated upper ends 43 of the rod 42, and as the machine is drawn over the surface the links of the wire will slightly rotate the rod 42, which will force rearwardly the rod 40, thereby turning the shaft 37 in its bearings in the guideway 15. This lowers for a short time the rear end of the bar 38 and permits the potato resting thereon to drop into the furrow made by the plow 7. After each link in the wire passes from the forks 43 the parts are returned to their normal positions by means of the spring 45. Connected to the plow-beam 6 is a pair of rearwardly-projecting beams 48, which carry on their downwardly-bent rear ends suitable disks 49, whereby the furrow is refilled and the potatoes covered after they have been dropped therein. The disks 49 are raised and lowered as the plow-beam 6 is operated by manipulating the lever 10.

A potato-planter constructed as described is thoroughly operative, and in addition to forming the furrow in which the potatoes are to be dropped it drops the potatoes therein at the required distances from each other and places the desired amount of soil upon them. Much labor and expense may be saved by a machine of this kind, which, as is evident, may be used for other purposes than planting potatoes.

I claim—

1. A potato-planter, comprising an adjustable plow for forming a furrow, a hopper, a chute alongside said hopper, a carrier operating within said chute and through the open bottom of the hopper, a hinged plate in the bottom of said chute below the carrier for spacing the potatoes, suitable connections for operating the said plate by means of check-wire to deliver the potatoes into the furrow at uniform distances from each other, and means for covering the potatoes within the furrow, substantially as specified.

2. A potato-planter, comprising a suitable plow to form a furrow, a hopper having an open bottom, a chute alongside said hopper, a carrier operating within said chute close to the open bottom of the hopper, a series of rotary arms for removing the potatoes from the carrier, a hinged plate within said chute below the carrier for receiving and spacing the potatoes, suitable connections for operating said plate by means of check-wire to space the potatoes in the furrow, and a pair of adjustable roller-disks for covering the potatoes, sustantially as specified.

3. In a potato-planter, a hopper having an open bottom, and a carrier operating adjacent to the said open bottom, the said carrier consisting of a chain having integral arms projecting therefrom and pointed hooks formed on the ends of said arms for engaging the potatoes, a series of rotary arms above the carrier for removing the potatoes from said hooks, a hinged plate below the carrier for receiving and spacing the potatoes, connections for operating the said plate by means of check-wire at suitable intervals to deliver the potatoes into a furrow, and a pair of roller-disks for covering the potatoes, substantially as specified.

In testimony whereof I affix my signature in presence of two witnesses.

THOMAS L. GOOD.

Witnesses:
EDWARD E. LONGAN,
JOHN D. RIPPEY.